United States Patent [19]

Corey

[11] 4,108,578
[45] Aug. 22, 1978

[54] RACK AND PINION WAVE MOTOR POWER PLANT

[76] Inventor: George Corey, 6340 Lankershim Blvd., N. Hollywood, Calif. 91606

[21] Appl. No.: 717,107

[22] Filed: Aug. 24, 1976

[51] Int. Cl.² .............. F04B 17/00; F04B 35/00; F16H 19/04
[52] U.S. Cl. .................... 417/331; 60/507; 74/30; 74/422
[58] Field of Search .......... 417/333, 332, 331, 390; 60/398, 507, 498, 505; 74/30, 89.17, 422, 130, 117, 352, 10.39; 417/390; 185/30; 290/53

[56] References Cited

U.S. PATENT DOCUMENTS

| 884,080 | 4/1908 | Fallis | 60/507 |
|---|---|---|---|
| 987,685 | 3/1911 | Atkinson | 60/507 |
| 988,508 | 4/1911 | Reynolds | 417/332 |
| 1,213,104 | 1/1917 | Hulden | 417/330 |
| 1,295,170 | 2/1919 | Hudgins | 417/332 |
| 1,864,499 | 6/1932 | Grigsby | 60/507 |
| 3,353,787 | 11/1967 | Semo | 417/330 |
| 3,791,757 | 2/1974 | Tarifa et al. | 417/424 R |
| 3,974,652 | 8/1976 | Lovmark | 60/398 |

Primary Examiner—Carlton R. Croyle
Assistant Examiner—Thomas I. Ross
Attorney, Agent, or Firm—Robert D. Farkas

[57] ABSTRACT

This disclosure pertains to a plurality of individual floats, each connected to an individual shaft. A pier is provided which supports the shafts in a substantially vertical direction. The shafts are free to move vertically as the floats rise and descend in accordance with the waves and tides at the ocean front. Each shaft is connected to a rotary hydraulic pump which is caused to rotate as the float ascends and descends. The pump in turn charges a tank with oil at high pressure, which in turn is fed to an engine. The engine drives an electric generator.

7 Claims, 3 Drawing Figures

RACK AND PINION WAVE MOTOR POWER PLANT

BACKGROUND OF THE INVENTION

1. Field of the Invention

This invention relates to apparatus which converts the tidal and wave motion of the ocean into useful power and more particularly to that class utilizing bouyant floats to respond to changes in the elevation of the surface of the water.

2. Description of the Prior Art

The prior art abounds with apparatus which utilize water motion or currents to generate rotation in shafts, wherein the rotation is ultimately converted into a source of useful power. U.S. Pat. No. 1,025,929 issued on May 7, 1912 to H. J. Snook teaches a helical screw disposed within the surface of a body of water, such that the screw is rotated due to the wave action or flow of currents caused by the impinging action of the water on the helical fins of the screw.

U.S. Pat. No. 1,153,416 issued on Sept. 14, 1915 to S. E. Bemiss et al discloses a flexible chain attached to a pair of disposed apart sprockets. A plurality of bucket-like devices are attached to the chain and disposed engaging the surface of a body of moving water. The shape of the buckets tend to preclude the buffeting about thereof due to the action of the water, by causing them to "dig into" the surface of the water, thereby maintaining intimate contact with some of the buckets and the surface of the water at all times.

Both of the aforementioned Patents suffer the common deficiency of coupling to small portions of the moving surface of the water and further fail to generate rotation of their output shafts when the water flow either reverses direction or when the waves recede in a downward direction from an uppermost position.

SUMMARY OF THE INVENTION

A primary object of the present invention is to provide a power converting apparatus which utilizes both tidal changes and wave motion to convert the displacement of ocean water into electrical energy.

Another object of the present invention is to provide an apparatus responsive to wave height changes as they increase and decrease in height.

Still another object of the present invention is to provide an apparatus which utilizes pipes to carry wave height and tidal elevational changes derived power from the ocean front to the shore line, rather than shafts, belts, chains or the like.

Yet another object of the present invention is to provide an efficient energy converting apparatus of virtually unlimited size and construction which need not be transported from place to place as the tide varies.

Heretofore, the prior art has concentrated, in the main, in the development of apparatus which utilized the flow of water in one direction, as a power source. Wave action, being essentially reciprocal in nature, is best capitalized upon by using the energy which causes the water to rise up as well as the energy which is available due to the wave height descending. Furthermore, tidal changes, in both directions, can be utilized in a similar fashion. The present invention employs a plurality of bouyant floats wherein each float is constrained in substantially all directions except the vertical. The action of the float, as it rises and falls in accordance with the wave motion and in accordance with the average tidally affected height of the water, is utilized to rotationally drive a hydraulic pump in one direction. Thus, the bouyant forces exerted on the float less the weight of the float are available to rotate the pump as the water level increases. The weight of the float, less whatever bouyant forces are exerted against it are available to rotate the pump in the very same direction. Since many floates are utilized, disposed along a portion of the ocean front, wave activity in any discrete area is translated into pump rotation for the floats associated therewith disposed within that area. Judicious placement of the floats taken into account with local tide and wave activity patterns enable a relatively short length of ocean to be used to absorb and convert substantial amounts of energy from the motion of the waters of the ocean. Since each pump, disposed on a common pier, produces energy in the form of a pressurized fluid, such as oil, the transmission of such form of energy to the shore line is economical in construction, efficient in operation, and devoid of moving parts.

These objects, as well as other objects of the present invention, will become more readily apparent after reading the following description of the accompanying drawings.

DESCRIPTION OF THE PREFERRED EMBODIMENT

The structure and method of fabrication of the present invention is applicable to a pier disposed having a lateral horizontal surface over a portion of the surface of the water located in the vicinity adjacent a shore front. A plurality of rotatable pumps are affixed to a horizontal surface of the pier and are matched in number by a plurality of bouyant floats disposed on the surface of the water therebelow. Each float is adapted to have a shaft extending vertically upwardly therefrom such that the shaft passes through the horizontal portion of the pier and engages the input shaft of the pump. A slot within the shaft is adapted to have a pair of racks mounted on the opposite internal walls thereof. Each rack engages one of a pair of pinions journaled about the shaft of the pump and coupled thereto by a one way clutch. One pinion causes the input shaft to rotate in the clockwise direction as the float shaft elevates. The other pinion causes the input shaft to again rotate in the clockwise direction as the float descends. Thus, the input shaft of the pump will rotate in one direction during each time that the float rises up and during each time that the float descends. Alternatively, spring loaded ratchets, in rack form, each having teeth disposed angularly in opposed vertical directions may be utilized to drive a common pinion having angularly disposed teeth engaging both racks. Again, the input shaft of the pump would be caused to rotate in a single direction as the float rises and falls in accordance with the action of the waves and the action of the tides.

The high pressure ports from all of the pump assemblies are connected, by way of individual check valves, to a high pressure receiving tank, preferably disposed on shore. A discharge port from the high pressure receiving tank is piped into a pressure operated engine of any suitable design. The discharge port of the engine is coupled to an oil reserve tank which, by way of a discharge port, provides oil to the pumps and interconnects, by way of a relief valve, to the high pressure receiving tank. The output shaft of the engine is coupled to a gear train, utilized to provide motive power, at high rotational speeds, to the input shaft of an electrical generator.

Figure 1:
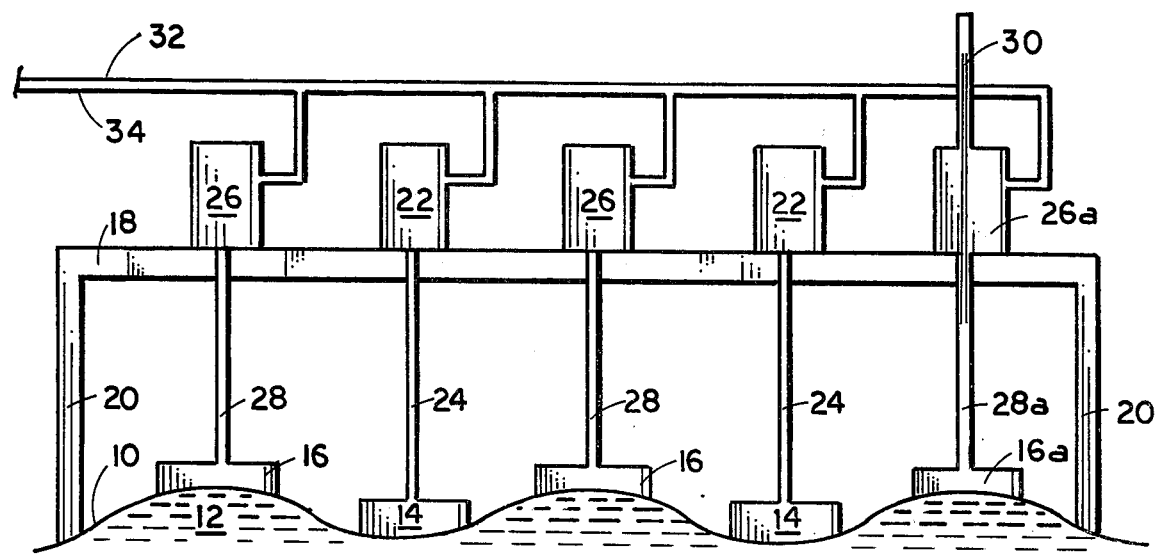
FIG. 1 is a front elevation view of a pier shown supporting float and pump portions of the present invention.

Now referring to the Figures and more particularly to the embodiment illustrated in FIG. 1 showing line 10, denoting the surface of water 12. Bouyant floats 14 are shown in a lowermost position in the troughs of the waves denoted by line 10 whilst bouyant floats 16 are shown on the crests of the waves, denoted by line 10. Pier 18 is shown supported by pier supporting elements 20, residing above floats 14 and 16. Pumps 22 are activated by shafts 24. Shafts 24 are free to move in a vertical direction in accordance with the vertical displacement of bouyant floats 14. Pumps 26 are activated by shafts 28. Shafts 28 are free to move in a vertical direction in accordance with the vertical displacement of bouyant floats 16. Shaft portion 30 is shown extending above pump 26a and forms a part of shaft 28a, affixed to float 16a. Each pump 22 and each pump 26 utilizes a shaft portion, similar to shaft portion 30 to provide a length of shaft compatible with the excursion of the tides and the excursion of the waves experienced at the locale in which pier 18 is installed. Pipes 32 and 34 communicate with each of pumps 22 and 26 so as to supply makeup oil and provide high pressure oil respectively from each of the aforementioned pump assemblies. Pier supporting elements 20 have sufficient height so as to enable floats 14 and 16 to experience a full range of vertical motion consistent with local tide and local wave height excursions.

Figure 2:
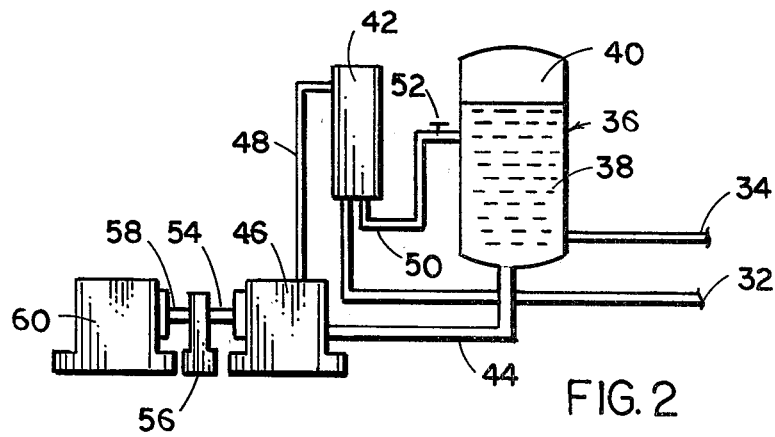
FIG. 2 is a schematic representation of some of the hydraulic components utilized in the present invention.

FIG. 2 illustrates pipe 34 providing high pressure oil to high pressure receiving tank 36. A volume of high pressure oil 38 is stored therewithin as well as a quantity of compressed air thereabove. An oil reservoir tank 42 provides makeup oil to the pumps 22 and 26, as shown in FIG. 1 by way of pipe 32. Pipe 44 communicates high pressure oil 38 to a pressure operated engine 46. Spent low pressure oil leaving engine 46 is coupled to reservoir tank 42 by way of pipe 48. Pipe 50 and relief valve 52 communicates oil between reservoir tank 42 and high pressure receiving tank 36 as is required. Engine 46 is adapted with an output shaft serving to drive the input side of gear train 56. Input shaft 58 of electric generator 60 is operated at higher rotational speeds than output shaft 54, utilizing gear train 56 therefor. Generator 60 provides electrical energy direct from the system.

Figure 3:
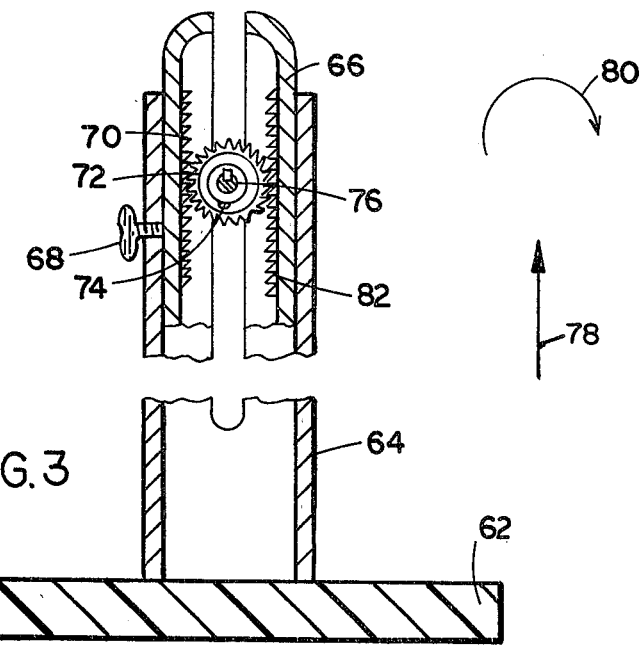
FIG. 3 is a cross-sectional side elevation view of a float, shaft, and gearing apparatus utilized in the present invention.

FIG. 3 illustrates a bouyant float 62 similar to that of floats 14 and 16 depicted in FIG. 1. Shaft 64 is affixed to float 62 and retains shaft 66 telescopingly therewithin. Locking screw 68 enables shaft 66 to be positioned at any desired location along the length of shaft 64 so as to permit shaft 66 to be adjusted relative to the tidal changes and height of pier 18, shown in FIG. 1, for the locale in which the present invention is installed. Rack 70 is shown engaging pinion 72 and utilizing one way clutch 74 to selectively journal pinion 72 to shaft 76. Shaft 76 typifies an input driving shaft for each of motors 22 and 26 shown in FIG. 1. Thus, when shaft 66 and 64 and float 62 move in the direction of arrow 78, shaft 76 rotates in a clockwise direction, as shown by arrow 80. Rack 82 is displaced slightly rearwardly from rack 70 and does not engage the teeth-like projections extending radially outwardly from pinion 72. A pinion, similar to pinion 72, not shown engages rack 82, and is disposed directly behind pinion 72. The additional pinion operates an additional one way clutch, similar to one way clutch 74, which in turn is journaled to shaft 76. The additional pinion and the additional one way clutch couples the displacement of shafts 64 and 66 and float 62, when displaced in a direction opposite to arrow 78 so as to cause shaft 76 to continue to rotate in the direction of arrow 80.

One of the advantages of the present invention is a power converting apparatus which utilizes both tidal changes and wave motion to convert the displacement of ocean water into electrical energy.

Another advantage of the present invention is an apparatus responsive to wave height changes as they increase and decrease in height.

Still another advantage of the present invention is an apparatus which utilizes pipes to carry wave height and tidal elevational changes derived power from the ocean front to the shore line, rather than shafts, belts, chains or the like.

Yet another advantage of the present invention is an efficient energy converting apparatus of virtually unlimited size and construction which need not be transported from place to place as the tide varies.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows.

I claim:

1. An apparatus for extracting and converting energy from ocean waves comprising a plurality of floats, a plurality of pumps, said plurality of pumps each having input shafts, said input shafts causing said pumps to convert oil from a low pressure state to a high pressure state when said input shafts are rotated, means to cause said input shafts to be rotated dependent upon the elevational heights of said plurality of floats, wherein said means to cause said input shafts to be rotated includes a plurality of shafts, one end of at least one of said plurality of shafts fixedly secured to a respective one of said plurality of floats, at least one rack, means whereby said rack is lockingly selectively secured to said at least one of said plurality of shafts along the length thereof, at least one pinion, a portion of the length adjacent the other end of said at least one of said plurality of shafts having the teeth of said rack continuously engaging the teeth of said at least one pinion, said pinion causing at least one of said input shafts to rotate as said at least one pinion is caused to rotate by the vertical displacement of said rack, and means to convert said oil to said high pressure state independent of the direction of vertical travel of each of said plurality of floats during a change in said elevational height, said plurality of floats being disposed bouyantly supported by a body of water, a motor, said motor being secured to a body of land, said body of land located adjacent said body of water, at least one pipe, said at least one pipe fluidly communicating said oil in said high pressure state to said motor.

2. The apparatus for extracting energy from ocean waves as claimed in claim 1 wherein said means to convert comprises a at least one one way clutch, said clutch rotatably coupling said one of said input shafts to said at least one pinion.

3. The apparatus for extracting energy from ocean waves as claimed in claim 2 further comprising at least another pinion, at least another rack, at least another one way clutch, said at least another rack being disposed in spaced apart relationship from said rack, said at least another pinion engaging said at least another rack, said at least another one way clutch and said one way clutch causing said at least one of said input shafts to rotate in the same direction as said at least one of said plurality of shafts is reciprocated in a vertical direction.

4. The apparatus for extracting energy from ocean waves as claimed in claim 1 further comprising a receiving tank, said plurality of pumps each having high pressure discharge ports, said plurality of pumps each having low pressure input ports, an oil reservoir tank, said high pressure discharge ports fluidly communicating to said receiving tank, said low pressure input ports fluidly communicating to said oil reservoir tank, a conduit, said conduit fluidly communicating to said receiving tank and said oil reservoir tank, a relief valve, said relief valve disposed intermediate the ends of said conduit, said motor being a pressure operated engine, the high pressure input port of said pressure operated engine fluidly communicating to said receiving tank, said pressure operated engine having a low pressure discharge port, said low pressure discharge port fluidly communicating with said oil reservoir tank, said pressure operated engine having an output shaft, an electrical generator, said electrical generator having an input driving shaft, means to rotatably couple said input driving shaft of said electrical generator to said output shaft of said pressure operated engine.

5. The apparatus for extracting energy from ocean waves as claimed in claim 4 wherein said means to rotatably couple comprises a gear train, said gear train causing said input driving shaft to rotate at higher speeds than said output shaft of said pressure operated engine.

6. The apparatus for extracting energy from ocean waves as claimed in claim 1 further comprising a stationary pier, said pier having a plurality of pier supporting elements, said plurality of pier supporting elements providing vertical support for said pier above the surface of said body of water, said pier being disposed a distance above the maximum height of said body of water disposed below said pier, said plurality of pumps being fixedly secured to said pier.

7. The apparatus for extracting energy from ocean waves as claimed in claim 5 wherein said receiving tank and said oil reservoir tank and said electrical generator are disposed on said body of land adjacent said body of water.

* * * * *